United States Patent
Gruhn et al.

(10) Patent No.: US 7,369,499 B2
(45) Date of Patent: May 6, 2008

(54) METHOD FOR TRANSMITTING DATA PACKETS IN A COMMUNICATION SYSTEM AND CORRESPONDING TRANSMITTER AND RECEIVER

(75) Inventors: Thomas Gruhn, Berlin (DE); Christina Gessner, München (DE); Reinhard Koehn, Berlin (DE); Georgios Papoutsis, Berlin (DE); Jürgen Schindler, Berlin (DE); Jörg Schniedenharn, Berlin (DE); Armin Sitte, Berlin (DE); Frank Wegner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 881 days.

(21) Appl. No.: 10/296,962

(22) PCT Filed: May 30, 2001

(86) PCT No.: PCT/DE01/02048

§ 371 (c)(1),
(2), (4) Date: Apr. 22, 2003

(87) PCT Pub. No.: WO01/93487

PCT Pub. Date: Dec. 6, 2001

(65) Prior Publication Data

US 2003/0161280 A1  Aug. 28, 2003

(30) Foreign Application Priority Data

May 30, 2000  (DE) ................................. 100 26 927

(51) Int. Cl.
*H04L 1/18* (2006.01)

(52) U.S. Cl. ................... 370/235; 370/428; 370/468
(58) Field of Classification Search ............. 370/235, 370/395, 468, 232, 345, 428; 704/500; 375/222, 375/221; 395/575, 650

See application file for complete search history.

(56) References Cited

U.S. PATENT DOCUMENTS

| 5,526,367 | A  | * | 6/1996  | Ono et al. ................. 714/748 |
| 5,541,955 | A  | * | 7/1996  | Jacobsmeyer .............. 375/222 |
| 5,877,812 | A  | * | 3/1999  | Krause et al. ........ 375/240.25 |
| 5,920,545 | A  | * | 7/1999  | Rasanen et al. ............ 370/232 |
| 5,982,813 | A  | * | 11/1999 | Dutta et al. ................ 375/219 |
| 6,266,346 | B1 | * | 7/2001  | Takeda et al. .............. 370/468 |
| 7,031,259 | B1 | * | 4/2006  | Guttman et al. ........... 370/235 |
| 7,154,905 | B2 | * | 12/2006 | Shin et al. .................. 370/465 |

FOREIGN PATENT DOCUMENTS

| EP | 448 405 A2 | 9/1991 |
| EP | 0 643 510 B1 | 3/1995 |

OTHER PUBLICATIONS

English Abstract 10-065675A of Japanese Patent Application 8-216383, Mar. 1998.
S. Kallel et al., "An Adaptive Hybrid ARQ Scheme", Wireless Personal Communications, Dec. 2000, pp. 297-311.

* cited by examiner

*Primary Examiner*—Chi Pham
*Assistant Examiner*—Kevin Mew
(74) *Attorney, Agent, or Firm*—Staas & Halsey LLP

(57) ABSTRACT

To transmit data packets between a transmitter and a receiver, the data packets are transmitted in coded from as coding units. The received data packets are stored in coded or uncoded form in the receiver inside a memory. The receiver notifies the transmitter of the capacity utilization of the memory.

13 Claims, 2 Drawing Sheets

DP1 ⟶ [COD] ⟶ CU1

CU11,CU21,CU31,CU41,CU12,CU51,CU61,CU32,
CU52,CU62,CU63,CU71

CU11,CU21,CU31,CU41,CU12,CU51,CU61,CU1,CU3,
CU7,CU5,CU62,CU81,CU91,CU63

METHOD FOR TRANSMITTING DATA PACKETS IN A COMMUNICATION SYSTEM AND CORRESPONDING TRANSMITTER AND RECEIVER

CROSS REFERENCE TO RELATED APPLICATIONS

This application is based on and hereby claims priority to German Application No. 100 269 27.3 filed on May 30, 2000, the contents of which are hereby incorporated by reference.

BACKGROUND OF THE INVENTION

1. Field of the Invention

The invention relates to a method for transmitting data packets in a communication system between a transmitter and a receiver and to a corresponding transmitter and a corresponding receiver.

2. Description of the Related Art

In communication systems such as mobile radio systems, data can be transmitted in packet form. The individual data packets are generally provided with a sequential number which corresponds to the order of their being sent, so that the receiver, at which the data packets do not necessarily arrive in the order in which they were transmitted, can put them into the original order again. For transmission between the transmitter and the receiver, it is customary to code the data packets. The coded data packets are referred to as "coding units" below.

In this context, the term "coding unit" denotes an information or redundancy set which is produced from the associated data packet and allows the data packet to be restored (decoded) at the receiver end, either individually or by suitable combination.

With packet data transmission, the receiver informs the transmitter about successful receipt of the transmitted data packets. In this context, successful receipt is also intended to be understood to mean successful decoding of the coding unit in question. The information about successful receipt is provided by "Acknowledge signals". Corresponding "Not-Acknowledge signals" are used by the receiver to inform the transmitter that a transmission has failed, that is to say a coding unit relating to the data packet in question has either not been received at all or could not be decoded successfully in the receiver. In some systems, only positive acknowledgement of receipt ("Acknowledge signals") is actually sent. In these systems, no explicit distinction between unreceived, unsent or incorrectly transmitted data can be provided in the acknowledgement of receipt. It is nevertheless possible to identify reception which has not occurred or has failed. By way of example, missing acknowledgement of receipt for a data unit No X when the acknowledgement of receipt for data unit No X–1 and data unit No X+1 has been received can infer failed reception (in line with an explicit negative acknowledgement of receipt, "Not-Acknowledge signals") for data unit No X.

In error situations, special error correction methods, such as the "ARQ" (Automatic Repeat Request) method, are used to correct the error which has arisen. The receiver's Acknowledge or Not-Acknowledge signals provided with the respective sequential number for the data packets which have not been successfully received provide the transmitter with the information regarding those data packets for which it needs to retransmit coding units. In the case of the "Hybrid-ARQ type I" method (HARQI), the receiver informs the transmitter about unsuccessfully received data packets. The transmitter then retransmits the appropriate, already transmitted coding unit. In the case of the "Hybrid-ARQ type II" (HARQII) or "Hybrid-ARQ type III" method (HARQIII), the transmitter produces a plurality of different coding units for each data packet. Initially, the transmitter transmits the first coding unit to the receiver. Only if this is not successfully decoded in the receiver does the transmitter transmit the second coding unit for the same data packet when requested to do so by the receiver. Whereas the 1st coding unit comprises the unaltered or only slightly coded data, for example, the data in the later (2nd, 3rd) coding units can have a higher level of coding. In this case, the different coding units for the same data packet can be produced simultaneously, with the units which are not immediately required for transmission initially being buffer-stored in the transmitter, or being produced individually by separate coding just before they are actually transmitted.

In the receiver, the two coding units for the same data packet are used for a fresh decoding attempt. If this decoding attempt fails as well, the ARQ III method might involve a third coding unit being transmitted by the transmitter, whereupon all three coding units associated with the same data packet are used for a fresh attempt at decoding the data packet.

In the case of Hybrid-ARQ II or III, the coding units can be coding polynomials which have been subjected to a rate adaptation method. Besides combining various coding units associated with a data packet for the purpose of decoding which is to be performed, coding units which have already been sent can also be resent in order to be combined with the already sent version of the same coding unit using "maximum ratio combining".

The receiver contains one of more memories in which the data packets decoded from the corresponding coding units are stored at least until the data packets with a relatively low sequential number have likewise been able to be decoded successfully. This is necessary so that the receiver can forward the data packets to downstream processing units in the order of their sequential numbers, that is to say in the order in which they were transmitted by the transmitter. Particularly in the case of the Hybrid-ARQ II or Hybrid-ARQ III method, it is also necessary, before a data packet is successfully decoded, for coding units for this data packet which have already been received by the receiver and with which decoding has not been possible thus far to be stored until receipt of a further coding unit for this data packet. The respective data packet's undecoded coding units received by the receiver are stored in analog form, if necessary, so that the appropriate decoding methods can be used later. By way of example, a data packet having three coding units of 1 000 bits each is transmitted. The analog resolution in the receiver is taken to be 8 bits. The necessary receiver memory for this data packet therefore needs to have a size of 24 000 bits.

At the transmitter and receiver ends, packet data transmission systems have "windows" ("transmit window" and "receiving window") of identical size which stipulate the sequential numbers for the data packets currently needing to be transmitted at the time. The bottom border of the window points to the data packet with the lowest sequential number for which the associated coding unit has not yet been transmitted or has not yet been successfully decoded. The top border of the window, which is at a fixed distance from the bottom border, stipulates that data packet with the highest sequential number whose coding unit needs to be transmitted or received at the current time. If the data packet at the bottom end of the receiving window has been received successfully, the receiving window advances to the next highest data packet which has not been received successfully. When the corresponding "Acknowledge signal" has been received, the transmitter's transmit window also advances as appropriate.

Particularly the storage of undecoded coding units for ARQII/III is very memory-intensive, since the coding units are present not in digital form but rather in analog form.

Up to now, the memory for the decoded and undecoded data packet in the receiver has been chosen to be large enough so that, even in the worst case, all the necessary data packets and coding units in the current receiving window can be stored. To ensure this, the memory thus needs to be chosen to be of appropriate size. For a prescribed small memory, a correspondingly small transmit window has therefore had to be chosen up to now. Particularly with long system delays and channels which are subject to interference, small transmit windows have a negative effect on the maximum permissible transmission rate, however.

SUMMARY OF THE INVENTION

The invention is based on the object of specifying a method for transmitting data packets in which the capacity of the memory in the receiver can be chosen to be as small as possible, so that production costs can be kept down and the power consumption of the memory is likewise low. The invention also allows a long transmit window for a prescribed small memory, which means that the maximum permissible data rate can be increased as compared with known methods.

The invention provides for the receiver to inform the transmitter about the utilization level of the memory used for storing the data packets in coded or uncoded form. This means that the transmitter is able to make the order of the coding units it transmits dependent on the utilization level of the receiver memory. Hence, if the memory has a high utilization level, the transmitter can, by way of example, preferably send the receiver coding units which can help to reduce the utilization level of the memory.

The receiver can advantageously inform the transmitter about when the utilization level of the memory exceeds a limit value. This keeps the signaling complexity regarding the utilization level of the memory very low, and the transmitter is nevertheless provided with the information required for adjusting the coding unit transmissions.

The memory in the receiver can either be a single memory or can comprise a plurality of memories.

The receiver can then transmit separate information about the form of each of the memories to the transmitter.

In this context, at least one of the memories can be used for storing successfully decoded data packets, which are stored in the memory at least until all data packets with a relatively low sequential number have been successfully decoded. This is necessary so that the receiver can forward the received data packets in the order in which they were transmitted by the transmitter to processing units arranged downstream thereof.

Alternatively or in addition, the memory or one of the memories in the receiver can also be used for storing coding units whose decoding initially failed. The coding units are then stored at least until the stored coding units are used, together with further coding units transmitted by the transmitter, for decoding the associated data packet.

In accordance with one development of the invention, the transmitter transmits to the receiver first coding units, which are associated with data packets for which it has not yet transmitted any other coding units up to now, and second coding units, which are associated with data packets for which it has already transmitted first coding units which failed to be decoded in the receiver, however, and which are used in the receiver together with the second coding units, for decoding the corresponding data packets. It is then beneficial if the transmitter takes the information about the utilization level of the memory as a basis for temporarily increasing the ratio of the transmission rate for the second coding units to the transmission rate for the first coding units. The result of this procedure is that the first coding units which are stored in the memory and on the basis of which the associated data packet is still not able to be decoded can be erased from the memory again as quickly as possible after receipt of an associated second coding unit for the same data packet and after successful decoding of the data packet, carried out together with this coding unit. In this way, memory capacity is recovered for other purposes, and the memory's utilization level falls. This can be achieved particularly beneficially if, when the utilization limit value for the memory has been exceeded, temporarily only second coding units, for which first coding units for the same data packet have already been stored in the memory, are transmitted. Examples of error correction methods for packet data transmission which use with such first and second coding units are the Hybrid-ARQ II and III methods.

Beneficially, following the occurrence of a particular condition, the transmitter reduces the ratio of the transmission rate for the second coding units to the transmission rate for the first coding units again. The particular condition can, by way of example, be the elapsing of a particular time interval. Alternatively, the particular condition can be a notification from the receiver to the transmitter indicating that the utilization level has dropped below a lower utilization limit value for the appropriate memory, which means that sufficient storage capacity is available again. The particular condition can also be the receiver's successful decoding of a particular number or of a particular percentage of those data packets for which first coding units have already been stored in the memory beforehand. Such conditions can naturally also be combined.

Another possibility is that, before the utilization limit value for the memory has been exceeded, the transmitter transmits first coding units which are stored in the memory in the event of failed decoding and are used at a later time, together with second coding units which are to be transmitted, for decoding the associated data packets, and, when the utilization limit value for the memory has been exceeded, the transmitter transmits coding units which are used, exclusively without further coding units which are to be transmitted, for decoding the associated data packets and are not stored in the memory if decoding has failed. An example of this development of the invention is changing from a Hybrid-ARQ II or III method to the Hybrid-ARQ I method when the utilization limit value has been exceeded.

Alternatively, retaining HARQ II, it is also possible for just the first coding unit to be transmitted for each data packet when the utilization limit value has been exceeded. In addition, the receiver can then be requested to erase the incorrect data immediately if decoding has failed.

An advantage in both cases is that, when the limit value for the memory has been exceeded, the coding units no longer need to be stored in the memory when decoding attempts are unsuccessful, which means that the memory's utilization level can be reduced.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
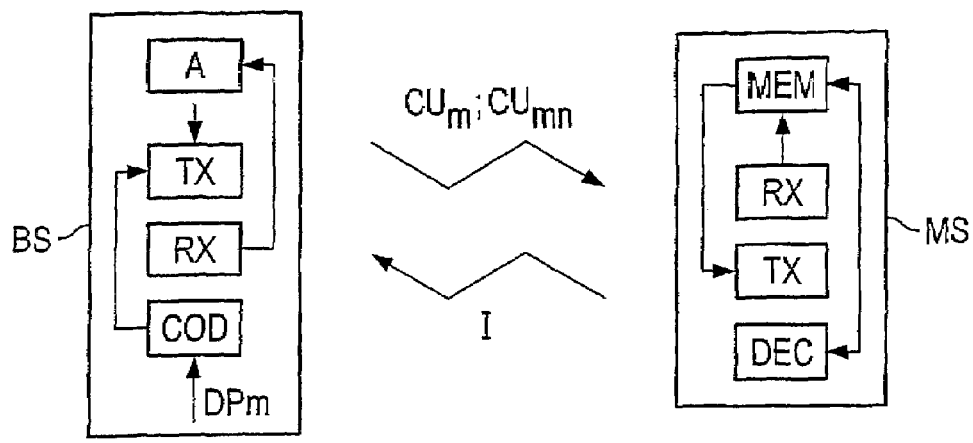
FIG. 1 is a block diagram of a communication system in accordance with the invention.

Reference will now be made in detail to the preferred embodiments of the present invention, examples of which are illustrated in the accompanying drawings, wherein like reference numerals refer to like elements throughout.

FIG. 1 shows a mobile radio system as an example of a communication system for transmitting data packets. For this mobile radio system, the type of multiple access method is of no significance. By way of example, it can be a system using TDMA and/or CDMA multiple access methods.

The base station BS has a transmission unit TX, a reception unit RX, a coding unit COD and an evaluation unit A. The mobile station MS likewise has a transmission unit TX and a reception unit RX. It also has a decoding unit DEC and a memory MEM. The coding unit COD in the base station BS codes data packets to form coding units $CUm$; $CUmn$. These are transmitted from the transmission unit TX to the reception unit RX in the mobile station MS. The received coding units are stored in the memory MEM in the mobile station MS. The decoding unit DEC then attempts to decode the coding units stored in the memory MEM. If decoding is successful, the decoded data packet is stored in the memory MEM and the corresponding coding unit is erased. If decoding is not successful, the corresponding coding unit $CUm$, $CUmn$ remains stored in the memory MEM, which means that it is available for further decoding attempts made using further coding units transmitted by the base station BS. In this first exemplary embodiment of the invention, the packet data transmission in the system shown in FIG. 1 is effected using the Hybrid-ARQ II or Hybrid-ARQ III error correction method.

As soon as the memory MEM in the mobile station MS becomes too full and hence exceeds an upper utilization limit, which means that there is a risk that the memory could shortly "overflow", the transmission unit TX transmits corresponding information I to the base station BS, where it is received by the reception unit RX therein. The evaluation unit A evaluates the information I and then influences the operating mode of the base station BS such that the order of transmission of the coding unit $CUm$; $CUmn$ is changed as explained in more detail further below, particularly with reference to FIGS. 6 and 7.

Instead of notification that the limit value has been overwritten, the subscriber station can also provide the base station with continuous information about the utilization level of the memory. The base station then establishes whether the limit value for the utilization level is being exceeded. This type of signaling is naturally more complex.

Figure 2:
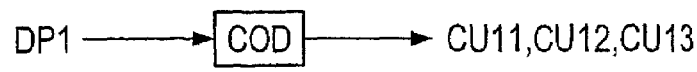
FIG. 2 is a block diagram of a first exemplary embodiment of a coding unit in a transmitter from FIG. 1.

FIG. 2 shows the decoding of one of the data packets DP1 by the coding unit COD in the base station BS. From the data packet DP1, three different coding units CU11 to CU13 are produced. These coding units are produced by respectively different coding methods. The data packet DPm are provided with an ascending sequential number, corresponding to the index m in the figures, according to the order in which they are sent by the base station BS. The sequential number likewise appears as an index m for the associated coding units. The sequential number m is transmitted with the associated coding unit to the receiver MS in order to allow association with the corresponding data packet there. In addition, the different coding units CUmn for the same data packet DPm are continuously numbered by the index n. When a data packet DPm is first transmitted, the base station BS initially sends only its first coding unit CUm1. Only if the mobile station signals that successful decoding of the coding unit CUm1 has not been possible does the base station send the second coding unit CUm2 for the data packet DPm in question. The decoding unit DEC in the mobile station MS then attempts to decode the data packet in question by simultaneously using the two coding units CUm1 and CUm2. If the decoding attempt fails again, the ARQ III method provides the option of also transmitting the third coding unit CUm3 and using it for a fresh decoding attempt.

Figure 3:
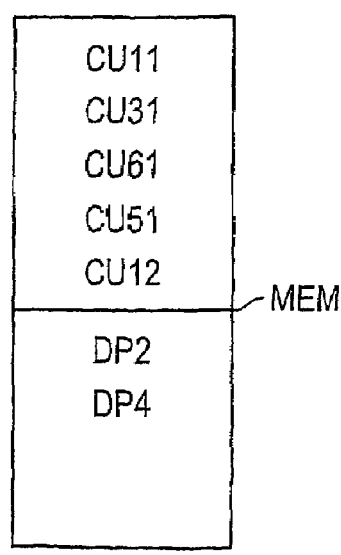
FIG. 3 is a block diagram illustrating the use of a memory in a receiver from FIG. 1 when using the coding unit from FIG. 2.

FIG. 3 shows the use of the memory MEM in the mobile station MS at a particular time. Coding units CUmn for the data packets DP1 to DP6 have already been transmitted. In this case, decoding of the data packets DP2 and DP4 was successful, which means that it has already been possible to erase the associated first coding units CU21 and CU41 from the memory MEM. However, the decoded data packets DP2 and DP4 still need to remain stored in the memory until the data packets DP1 and DP3 have been successfully decoded so that the decoded data packets can be processed further in the order of their sequential numbers m, and the receiving window can advance. In the case shown in FIG. 3, decoding of the coding units CU11, CU31, CU61 and CU51 was not successful, which means that they remain stored in the memory MEM for later combination with other coding units for the same data packet for the purpose of another decoding attempt. In addition, the base station BS has already transmitted the second coding unit CU12 for the first data packet DP1 to the mobile station MS. Since, in this case, simultaneous use of the coding units CU11 and CU12 do not allow for successful decoding of the data packet DP1 either, the coding unit CU12 also needs to be stored in the memory MEM so that it is available later for another decoding attempt following transmission of the third coding unit CU13 for the same data packet DP1.

Figures 4, 5, 6, 7:
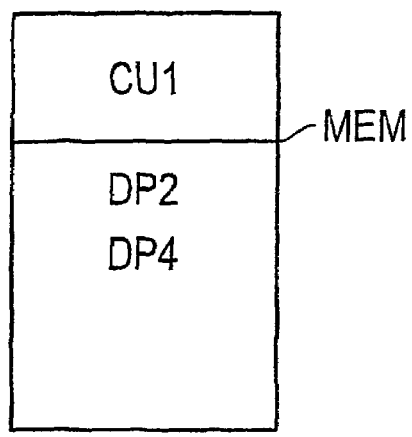
FIG. 4 is a block diagram of a second exemplary embodiment of a coding unit in the transmitter from FIG. 1.
FIG. 5 is a block diagram illustrating the use of a memory in the receiver in FIG. 1 when using the coding unit from FIG. 4, and FIGS. 6 and 7 are text showing the order of transmission of coding units by the transmitter in FIG. 1 for various exemplary embodiments of the invention.

FIG. 6 shows the order in which the coding units CUmn are transmitted by the base station BS, which meanwhile (namely after transmission of the coding unit CU61) results in the use of the memory MEM shown in FIG. 3. To transmit the data packets DPm sequentially according to their sequential number m, the base station initially transmits the first coding units CU11 to CU41 for the first four data packets DP1 to DP4. In this exemplary embodiment, the Hybrid-ARQ III method is used. In line with the explanations relating to FIG. 3, the coding units CU21 and CU41 can be used for successfully decoding the associated data packets DP2 and DP4. However, the coding units CU11 and CU31 cannot be decoded successfully and therefore remain temporarily buffer-stored in the memory MEM. At irregular intervals, the mobile station MS also informs the base station BS about the coding units CU11, CU31 which have been received without being able to be successfully decoded. This allows the base station BS to transmit, alternately, second coding units CU12, CU32 for already sent data packets DP1, DP3 and first coding units CU51, CU61 for as yet unsent data packets DP5, DP6. If the utilization level of the receiver memory MEM now exceeds a particular limit (this is the case here following receipt of the first coding unit CU61 for the sixth data packet DP6, which coding unit likewise cannot be decoded successfully), the mobile station MS informs the base station BS about this by transmitting the information I. On the basis of the information I evaluated by the evaluation unit A within the base station, the base station initially does not transmit any more first coding units CUm1, but rather only second coding units CU32, CU52, CU62 and third coding units CU63 for data packets for which first coding units CUM1 have already been stored in the memory MEM beforehand. FIG. 3 shows the state of the memory MEM after receipt of the coding unit CU61.

Since temporarily no more first coding units CUm1 are transmitted when the utilization limit value for the memory MEM has been exceeded, the utilization level of the memory MEM is briefly reduced, since those data packets for which coding units were already stored in the memory MEM are now preferably decoded successfully. Following successful decoding of a data packet, the associated coding units can be erased from the memory. The reason for this is that, since storing coding units also takes up a very large amount of memory space as compared with successfully decoded data packets, it is beneficial to store as few coding units in the receiver as possible. When the utilization level has dropped below a lower utilization limit for the memory, the mobile station MS again transmits information I to the base station BS in order to notify it of this. The base station BS then starts to transmit predominantly or exclusively first coding units CUm1 (starting with the coding unit CU71 in FIG. 6).

The upper utilization limit for the memory MEM can be, by way of example, a particular percentage of the memory's storage capacity, for example 80%. The lower memory limit could signify, by way of example, utilization of 20% of the memory MEM. Instead of the utilization level's being below a lower utilization limit, the elapsing of a particular period of time or the successful decoding of a particular number or of a particular percentage of those data packets for which coding units CUmn are already stored in the memory MEM in undecoded form can also be used.

FIG. 4 shows another exemplary embodiment of the coding unit COD in the base station BS. For the rest of the scenario, it is assumed, as a departure from the exemplary embodiments outlined above, that an error correction method of the Hybrid-ARQ I type is used. Accordingly, the coding unit COD produces only one coding unit CUm from each data packet DPm. In this exemplary embodiment too, in line with FIG. 5, the coding units CUm received without being able to be decoded successfully are stored in the memory MEM in the receiver MS. By way of example, the coding unit CU1, which cannot be decoded successfully on account of incorrect transmission, is used, together with another version of the same coding unit CU1 for the data packet DP1, for a further decoding attempt at a later time after the coding unit CU1 has been transmitted by the base station BS a second time. In this exemplary embodiment too, the exceeding of a particular utilization limit for the memory MEM is followed preferably or exclusively by the transmission of coding units CUm which have already been the subject of a failed decoding attempt beforehand and for which a received version has already been stored in the memory MEM. The exemplary embodiment explained with reference to FIG. 5 is therefore very similar to that from FIG. 3.

FIG. 7 shows the order of transmission of coding units CUmn; CUm by the base station BS in line with another exemplary embodiment of the invention, in which the Hybrid-ARQ III method is initially used. The coding units CU11 to CU61 are transmitted in the same order as in the exemplary embodiment explained with reference to FIG. 6. When the limit value for the utilization level of the memory MEM has been exceeded (as is the case following transmission of the coding unit CU61), however, the error correction method is changed. Whereas the Hybrid-ARQ III method was used beforehand, the Hybrid-ARQ I method is then used. That is to say the type of coding for the data packets DPm by the coding unit COD in the base station BS is changed such that, instead of three respective coding units per data packet, only one is now produced. If the base station BS now receives from the mobile station MS the message that a particular data packet could not be decoded successfully, only the same coding unit CUm is transmitted again. In this exemplary embodiment, however, the fresh attempt to decode the same data packet DPm involves no use of a plurality of received versions of the decoding units CUm. Instead, the fresh decoding attempt is made exclusively using the last version of the coding unit CUm which was transmitted. For this reason, this exemplary embodiment involves no undecoded decoding unit CUm; CUmn being stored in the memory MEM following the change to the Hybrid-ARQ I method, as a result of which the memory's utilization level is not increased further. Coding units already stored to date can now be erased from the memory, which means that this also results in the utilization level being reduced. When the utilization limit for the memory MEM has been exceeded, the base station initially preferably (or, in the case of other exemplary embodiments, exclusively) transmits coding units CUm which are associated with data packets DPm for which coding units CUmn and CUm have already been transmitted beforehand, in order to speed up the advance of the receiving window. In the present case, it is assumed that the received coding units CU1, CU3, CU7, CU5 are decoded successfully, which means that the utilization level of the memory MEM falls.

After a previously stipulated period of time, the Hybrid-ARQ I method is changed back to the Hybrid-ARQ III method. In addition, the transmission rate for coding units CU62, CU63 for which coding units CU61 have already been transmitted beforehand is again reduced, relative to the transmission rate for coding units CU81, CU91 for data packets which have been transmitted for the first time, to the value which it had before the upper utilization limit value for the memory MEM was exceeded.

The result of the invention is that the receiving window describing the respective data packets which are currently to be received using their sequential numbers can be advanced as quickly as possible, with only a relatively small amount of storage capacity in the memory MEM being required for newly received data packets in coded or decoded form. This is because the invention ensures that exceeding of the utilization limit value is preferably followed by the data packets with the respective lowest sequential number being able to be decoded in the receiver, which means that the bottom border of the receiving window can be moved upward, and all data packets with a relatively high sequential number which have already been successfully decoded can also be erased from the memory and forwarded to downstream processing units or can be output on a microphone or a display on the mobile station MS. The Hybrid-ARQ II or III method involves the stored coding units CUmn being able to be erased relatively quickly, for example, as soon as the data packets have been decoded successfully with the aid of the exclusive or preferred repetitions of coding unit transmissions for the same data packets, which repetitions occur after the utilization limit has been exceeded.

The upper utilization limit for the memory MEM can also be 100%, for example.

In the exemplary embodiment explained with reference to FIG. 7, which involves changing between different error correction methods, it is naturally necessary for the transmitter BS to inform the receiver MS about the change so that decoding in the receiver takes place in line with the field protection method used for the coding in the transmitter.

Up to now, the memories shown in FIGS. 3 and 5 have been regarded as an integrated memory area. However, the memory MEM can also be split into a plurality of separate memories. This is indicated in FIGS. 3 and 5 by the vertical line. In this case, the memory MEM has been split into two independent memory areas which can naturally also be implemented by two independent memories. The first memory area is respectively used for storing the coding units CUm; CUmn which have not been able to be decoded successfully up to now, and the second memory area is used for storing the data packets DPM which have been able to be decoded successfully, which are situated above the bottom border of the receiving window, that is to say which cannot be removed from the memory MEM, until the data packets with a relatively low sequential number m which are still outstanding have been successfully decoded by the receiver. In the case of this storage MEM, split into a plurality of independent memory areas, the respective utilization level of the storage capacity can then be monitored for each memory area respectively in the manner described above. By way of example, each memory area can have an upper utilization limit stipulated for it, and if this limit is exceeded the base station BS preferably or exclusively sends "retransmissions", that is to say transmits coding units which are associated with data packets DPm for which coding units CUmn which have not been able to be decoded successfully have already been transmitted beforehand.

The invention allows the receiver-end memory MEM, provided for buffer-storing the successfully decoded data packets and/or the coding units which cannot be decoded successfully, to be chosen to be smaller than has been necessary to date for the purpose of ensuring that the system is capable of operation. For this reason, the necessary storage capacity of the memory MEM is also no longer directly correlated to the size of the receiver window. The fact that the invention allows smaller receiver memories MEM to be produced reduces the current consumption in corresponding receiver circuits, and production costs are reduced. The Hybrid-ARQ II or III method or comparable error correction methods in which each individual coding unit CUmn to be stored requires a relatively large amount of memory space can thus also be used for appliances in which these methods have not been suitable on account of their relatively high memory space requirement as compared with other error correction methods, such as Hybrid-ARQ I. This relates particularly to low-cost appliances in which a large memory cannot be used for cost reasons.

Although the invention has been described above with reference to a base station as the transmitter of data packets and a subscriber station as the receiver of the data packets, it can naturally also be applied to transmission of data packets in the opposite direction, that is to say when the subscriber station is the transmitter and the base station is the receiver, in which case an appropriate memory MEM then needs to be provided in the base station BS.

The invention has been described in detail with particular reference to preferred embodiments thereof and examples, but it will be understood that variations and modifications can be effected within the spirit and scope of the invention.

The invention claimed is:

1. A method for transmitting data packets in a communication system between a transmitter and a receiver, comprising:
    transmitting the data packets in coded form as first coding units, associated with first data packets for which no coding units were transmitted previously, and second coding units, associated with second data packets for which first coding units were previously transmitted, but which failed to be decoded in the receiver, and which are used in the receiver, together with the second coding units, for decoding the second data packets;
    storing the data packets received from said transmitting in at least one of coded and uncoded form in a memory of the receiver; and
    informing the transmitter about the utilization level of the memory before the memory overflows; and
    temporarily increasing a ratio of the second coding units to the first coding units transmitted by the transmitter based on information about the utilization level of the memory.

2. The method as claimed in claim 1, wherein said informing is performed by the receiver notifying the transmitter when the utilization level of the memory exceeds a limit value.

3. The method as claimed in claim 2, wherein each data packet has an associated sequential number, and
    wherein said storing stores the data packets received by the receiver and successfully decoded from the coding units in the memory in an uncoded state at least until all data packets with a determinable sequential number have been successfully decoded.

4. The method as claimed in claim 3, wherein said storing stores received coding units in the memory in a coded state, if attempts at decoding data packets received by the receiver have failed, at least until the received coding units have been used, together with other coding units transmitted by the transmitter, for decoding at least one associated data packet.

5. The method as claimed in claim 1, further comprising temporarily transmitting only second coding units from the transmitter upon receipt of notification that the utilization value for the memory has been exceeded.

6. The method as claimed in claim 5, further comprising further reducing the ratio of the second coding units to the first coding units transmitted by the transmitter, following occurrence of a particular condition.

7. The method as claimed in claim 6, wherein the particular condition is elapsing of a particular time interval.

8. The method as claimed in claim 6, wherein the particular condition is successful decoding by the receiver of at least one of a particular number and a particular percentage of the second data packets.

9. The method as claimed in claim 6, wherein the particular condition is a notification from the receiver to the transmitter indicating that the utilization level has dropped below a further utilization value for the memory.

10. The method as claimed in claim 9, wherein said transmitting includes transmitting, before the utilization limit value for the memory has been exceeded, first coding units to be stored in the memory in the event of failed decoding for decoding the at least one associated data packet in conjunction with second coding units transmitted later, and transmitting, when the utilization limit value for the memory has been exceeded, first coding units used exclusively without second coding units for decoding the associated data packets and are not stored in the memory if decoding fails.

11. A receiver for receiving data packets transmitted by a transmitter in a communication system, comprising:

a reception unit to receive the data packets in coded form as first coding units, associated with first data packets for which no coding units were transmitted previously, and second coding units, associated with second data packets for which first coding units were previously transmitted, but which failed to be decoded in the receiver, and which are used in the receiver, together with the second coding units, for decoding the second data packets;

a memory to store the received data packets in coded or uncoded form; and a transmission unit to transmit information about a utilization level of said memory to the transmitter before the memory overflows, so that the transmitter can temporarily increase a ratio of the second coding units to the first coding units transmitted by the transmitter based on information about the utilization level of the memory of the receiver, thereby reducing the receiver memory utilization level.

12. A transmitter for transmitting data packets to be received by a receiver in a communication system, comprising:

a coding unit to code the data packets to form first coding units, associated with first data packets for which no coding units were transmitted previously, and second coding units, associated with second data packets for which first coding units were previously transmitted, but which failed to be decoded in the receiver, and which are used in the receiver together with the second coding units, for decoding the second data packets;

a transmission unit to transmit the coding units to the receiver;

a reception unit to receive information about a utilization level of a memory in the receiver, transmitted before the memory overflows; and an evaluation unit to evaluate the information and temporarily increase a ratio of the second coding units to the first coding units transmitted by the transmitter based on information about the utilization level of the memory of the receiver evaluated by the evaluation unit, thereby reducing the receiver memory utilization level.

13. The transmitter as claimed in claim 12, wherein said evaluation unit changes an operating mode of said transmitter based on the information received from the receiver.

* * * * *